Patented Dec. 22, 1931

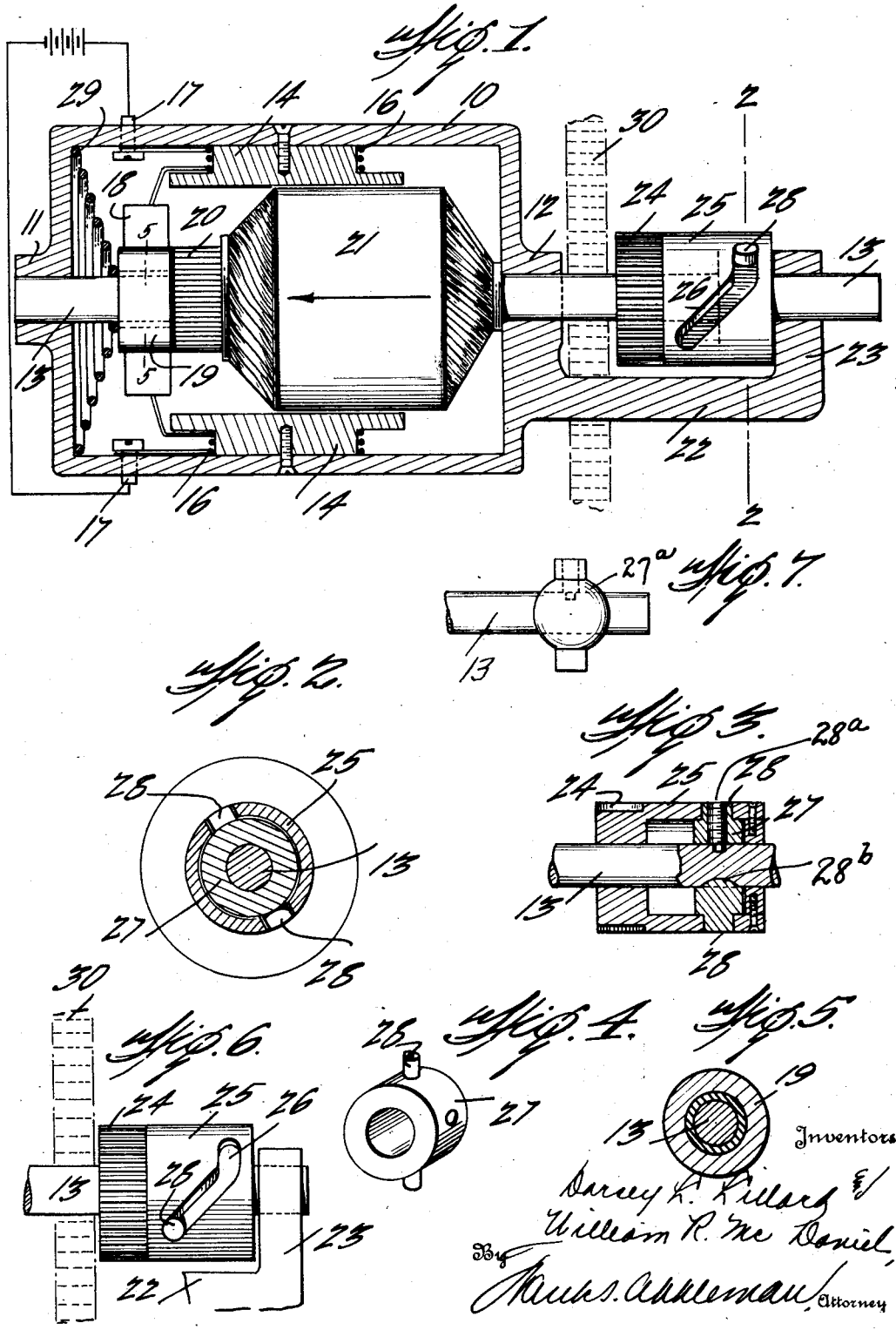

1,837,974

UNITED STATES PATENT OFFICE

DORSEY L. LILLARD AND WILLIAM R. McDANIEL, OF ENGLEWOOD, TENNESSEE

STARTING MOTOR FOR INTERNAL COMBUSTION ENGINES

Application filed August 7, 1930. Serial No. 473,716.

This invention relates to starting motors for internal combustion engines and has for an object the provision of novel means for coupling the starting motor to a fly wheel or other rotative part of an internal combustion engine through which its pistons are driven for the purpose of starting the said engine.

It is a further object of this invention to provide novel means for operating an electric motor and transmitting its power for starting an internal combustion engine and it is furthermore an object of the invention to provide novel means for causing the power transmitting instrumentalities to be disconnected when the peripheral speed of the internal combustion engine exceeds the peripheral speed of the motor.

The invention also includes means for retaining the starting motor in the last mentioned position until novel means, electrically energized and operated, effects a recoupling of the motor and the part of the drive of the internal combustion engine with which it coacts.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view partly in section and partly in elevation of a starting motor embodying the invention;

Figure 2 illustrates a sectional view on the line 2—2 of Figure 1 with the bracket omitted;

Figure 3 illustrates a longitudinal sectional view on the line 3—3 of Figure 1;

Figure 4 illustrates a detail view of a collar, a section of which is illustrated in Figures 2 and 3;

Figure 5 illustrates a sectional view through the commutator shaft and ring;

Figure 6 illustrates a detail view showing the relation of parts at one stage of operation of the device; and Figure 7 illustrates a view in elevation of the shaft showing a modified form of collar.

The motor is preferably associated with a housing 10 having journal bearings at 11 and 12 in which an armature shaft 13 is rotative. While the inventor does not wish to be limited as to the arrangement of parts set forth, except insofar as required by the annexed claims, as illustrated in the present embodiment, the housing is provided on its inner surface with pole pieces such as 14 which may be secured in place by fastenings such as screws or the like.

The pole pieces have suitable coils 16, each of which may have an end connected to a terminal 17 in circuit with terminals of a battery to produce field coils. An end of the winding of each coil is also connected to a brush such as 18 and the brushes bear against the metallic ring 19 secured on the armature shaft in proximity to the commutator 20 of an armature 21. While I have referred to the terminals 17 as connected to opposite terminals of a battery, it is obvious that one of them may be grounded to the frame of an automobile or otherwise arranged to establish a circuit with the battery.

The ring 19 and the commutator are preferably of the same diameter and the ring is insulated from the commutator and from the armature shaft, in order that when current is established through the wiring of the field coils, the initial circuit will be completed through the brushes and the ring, and the coils being magnetized will pull the armature longitudinally of its axis and carry the commutator in engagement with the brushes, after which the armature will rotate for a purpose to be presently explained.

The field coils are located from the center of the coils in the armature in order that the field coils will act to draw the armature axially and force the gear wheel of the starting motor into the gear of the internal combustion engine.

The housing 10 will have a bracket 22 extending from it and provided with a journal bearing 23 in which the armature shaft may rotate or move axially.

The gear wheel 24 is preferably formed as a part of a sleeve 25 and the sleeve is provided with camming slots such as 26 that extend diagonally of the sleeve for a greater part of its length and circumferentially of the sleeve at its outer end. A collar 27 is secured on that part of the armature shaft between the bearings 12 and 23 and it has radial arms or projections 28 that extend into the camming slots 26. The collar may be secured on the shaft by a screw 28$^a$ threaded through an arm and having its ends seated in the shaft and a key 28$^b$ of ordinary type may also be employed. When the parts are in the position shown in Figure 1, the radial arms are in that part of the camming slot which extends circumferentially and as the armature shaft is moved axially, the arms exert pressure on the walls of the slots and move the teeth of the gear wheel into engagement with the teeth of the fly wheel.

A fragment of a fly wheel 30 as is commonly used on crank shafts of internal combustion engines is in operative relation to the gear wheel 24 and it is the purpose of the inventor that when the armature 20 is shifted axially by the electromagnetic means heretofore described, the teeth of the gear wheel 24 will be forced into mesh with the teeth of the fly wheel and that when the armature is rotated, rotary motion will be communicated to the fly wheel to start the engine. As stated, when the internal combustion engine has started and the fly wheel tends to rotate the gear wheel faster than it is rotated by the electric motor, the sleeve will rotate on the armature shaft and the edges of the camming slots will operate on the arms and cause the sleeve to move axially of the armature shaft and disengage the teeth of the gear wheel from the teeth of the fly wheel. The bracket 22 will form an abutment for the sleeve as it is moved axially of the commutator shaft, and the parts will then assume the position in which they are shown in Figure 6.

A coiled spring 29 is installed in the housing at one end and it bears against the ring 19 and its force is intended to return and hold the parts of the starting motor in the position in which they are shown in Figure 1 after the starting motor is disengaged and the field coils are demagnetized.

In Figure 7 a spherical element 27$^a$ is a modified form of collar.

We claim:

1. In a starting motor for internal combustion engines, an armature having a shaft mounted for rotary and axial movement, a commutator on said shaft, field coils with relation to which the armature is rotative and slidable, means for establishing a circuit through the field coils independently of the armature, brushes engaged and disengaged by the commutator, a gear wheel mounted for rotation and axial movement on the commutator shaft, means for communicating the axial motion of the commutator shaft to said gear wheel, a gear of an internal combustion engine engageable by said gear wheel, and means whereby the gear causes a disengagement of the gear wheel therefrom when the peripheral speed of the gear exceeds that of the gear wheel.

2. In a starting motor for internal combustion engines, an armature having a shaft mounted for rotary and axial movement, a commutator on said shaft, field coils with relation to which the armature is rotative and slidable, means for establishing a circuit through the field coils independently of the armature, brushes engaged and disengaged by the commutator, a gear wheel having a sleeve mounted on the armature shaft, said sleeve having camming slots extending substantially longitudinally of the sleeve and having ends extending circumferentially of the sleeve, a member on the armature shaft having arms projecting into the camming slots and operative to move the gear wheel as the armature shaft moves axially, the said arms operating to move the sleeve axially when the gear wheel and sleeve are rotated independently of the armature shaft.

3. In a starting motor for internal combustion engines, an armature having a shaft mounted for rotary and axial movement, a commutator on said shaft, field coils with relation to which the armature is rotative and slidable, means for establishing a circuit through the field coils independently of the armature, brushes engaged and disengaged by the commutator, a gear wheel having a sleeve mounted on the armature shaft, said sleeve having camming slots extending substantially longitudinally of the sleeve and having ends extending circumferentially of the sleeve, a member on the armature shaft having arms projecting into the camming slots and operative to move the gear wheel as the armature shaft moves axially, the said arms operating to move the sleeve axially when the gear wheel and sleeve are rotated independently of the armature shaft, and means for returning the armature and its shaft to its normal position when the field coils are demagnetized.

4. In a starting motor for internal combustion engines, an armature having a shaft mounted for rotary and axial movement, electromagnetic means for moving the armature shaft axially, a gear wheel slidably mounted on the armature shaft, the said gear wheel having a slot with camming edges extending lengthwise thereof for a portion of its length and circumferentially of the said gear wheel at its end, and a member stationary with the shaft extending into the slot and operative to cause the gear wheel to move axially with the shaft or longitudinally thereof.

DORSEY L. LILLARD.
WILLIAM R. McDANIEL.